United States Patent [19]

Mellander et al.

[11] Patent Number: 4,691,556
[45] Date of Patent: Sep. 8, 1987

[54] LOAD-SENSING FACEFORM FOR CRASH DUMMY INSTRUMENTATION

[75] Inventors: Hugo Mellander, Göteborg; Stefan Nilsson, Marstrand, both of Sweden; Charles Y. Warner; Milton G. Wille, both of Provo, Utah; Magnus Koch, Göteborg, Sweden

[73] Assignee: AB Volvo, Göteborg, Sweden

[21] Appl. No.: 824,666

[22] Filed: Jan. 31, 1986

[51] Int. Cl.[4] .................... G01N 3/30; G01L 25/00
[52] U.S. Cl. .......................... 73/12; 73/1 B; 73/862.04; 73/866.4
[58] Field of Search ............... 73/12, 432 J, 432 SD, 73/172, 862.04, 862.54, 862.68, 762, 787, 804, DIG. 4, 1 B, 1 R; 310/338, 800; 434/267, 270, 274

[56] References Cited

U.S. PATENT DOCUMENTS

| | | | |
|---|---|---|---|
| 3,331,236 | 7/1967 | Payne et al. | 73/12 |
| 4,055,878 | 11/1977 | Radice . | |
| 4,366,768 | 1/1983 | Kulischenko et al. . | |
| 4,393,093 | 7/1983 | Sprout, Jr. . | |
| 4,398,173 | 8/1983 | Kulischenko et al. . | |
| 4,488,873 | 12/1984 | Bloomfield et al. . | |
| 4,499,394 | 2/1985 | Koal . | |
| 4,512,431 | 4/1985 | Bloomfield . | |
| 4,555,953 | 12/1985 | Dario et al. | 73/862.04 |
| 4,557,977 | 12/1985 | Memmer et al. . | |

OTHER PUBLICATIONS

7000-MDAS Reference Manual, 1984 (pertinent portion attached).
Biofidelity Improvements to the Hybrid III Headform, Newman & Gallup, 28th Stapp Car Crash Conference, 1983.

Primary Examiner—Charles A. Ruehl
Attorney, Agent, or Firm—Burns, Doane, Swecker & Mathis

[57] ABSTRACT

A test dummy head for measuring impact surface forces and pressures applied thereto comprises a pressure-sensing face incorporated to a dummy skull structure. A plurality of thin pressure-sensitive electric films are attached to the face. The films provide electrical signals representative of a time history of pressure or force applied up to 100 individual areas of the face. A pressurized calibration chamber is employed to simplify the calibration process.

10 Claims, 4 Drawing Figures

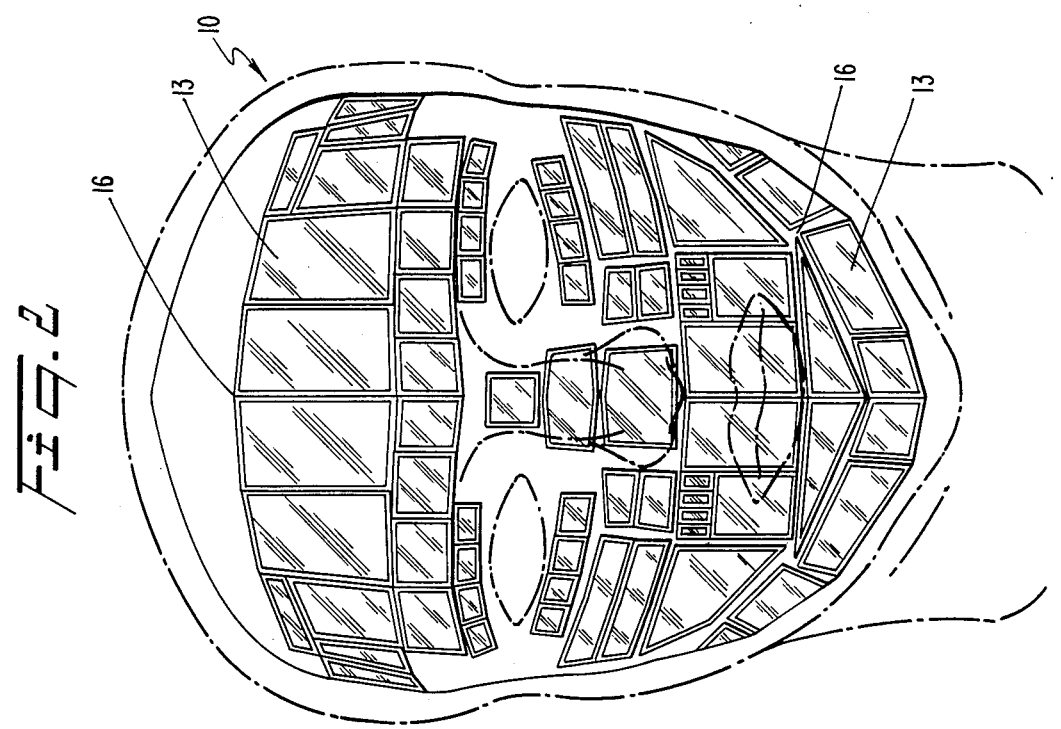
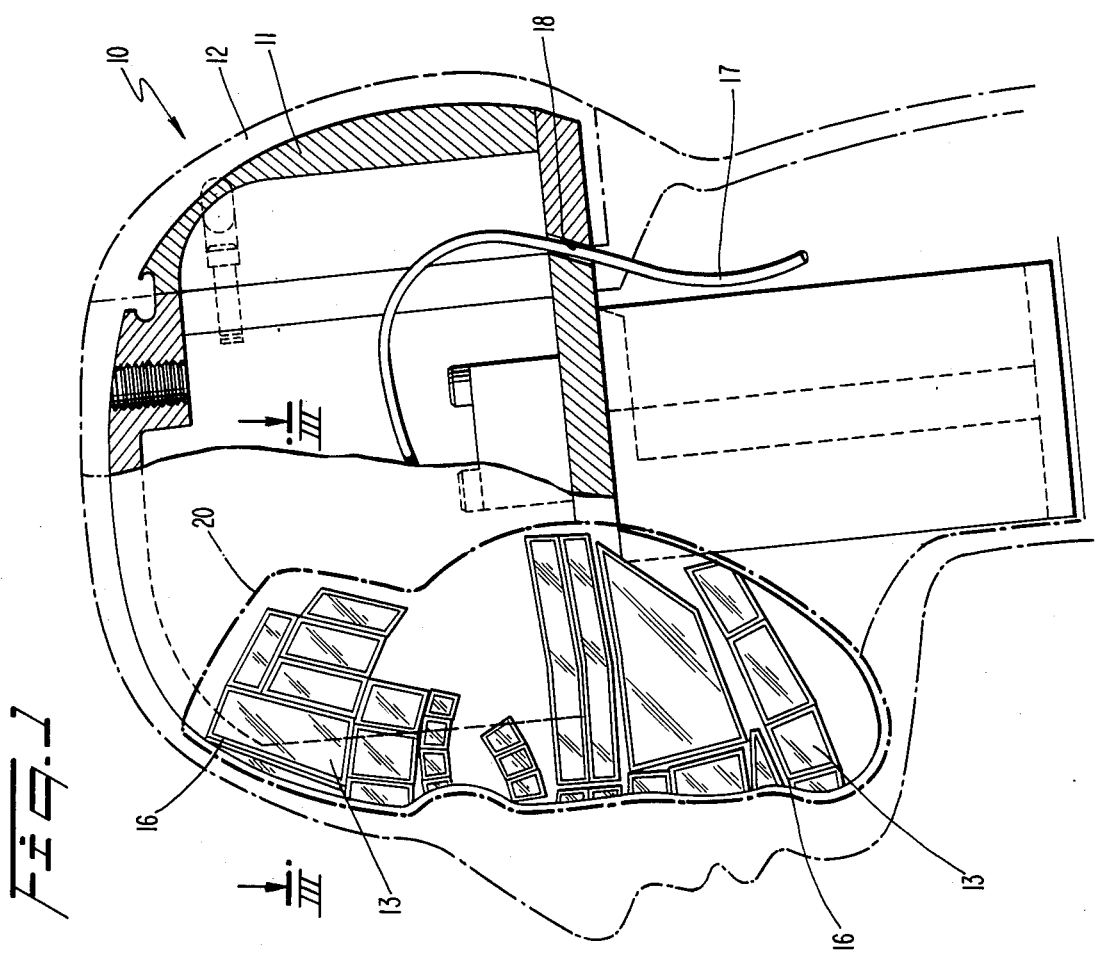

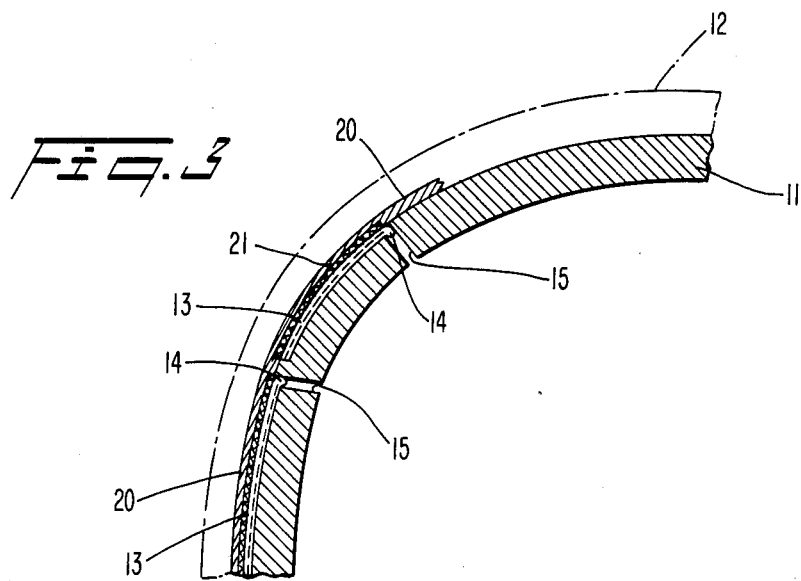
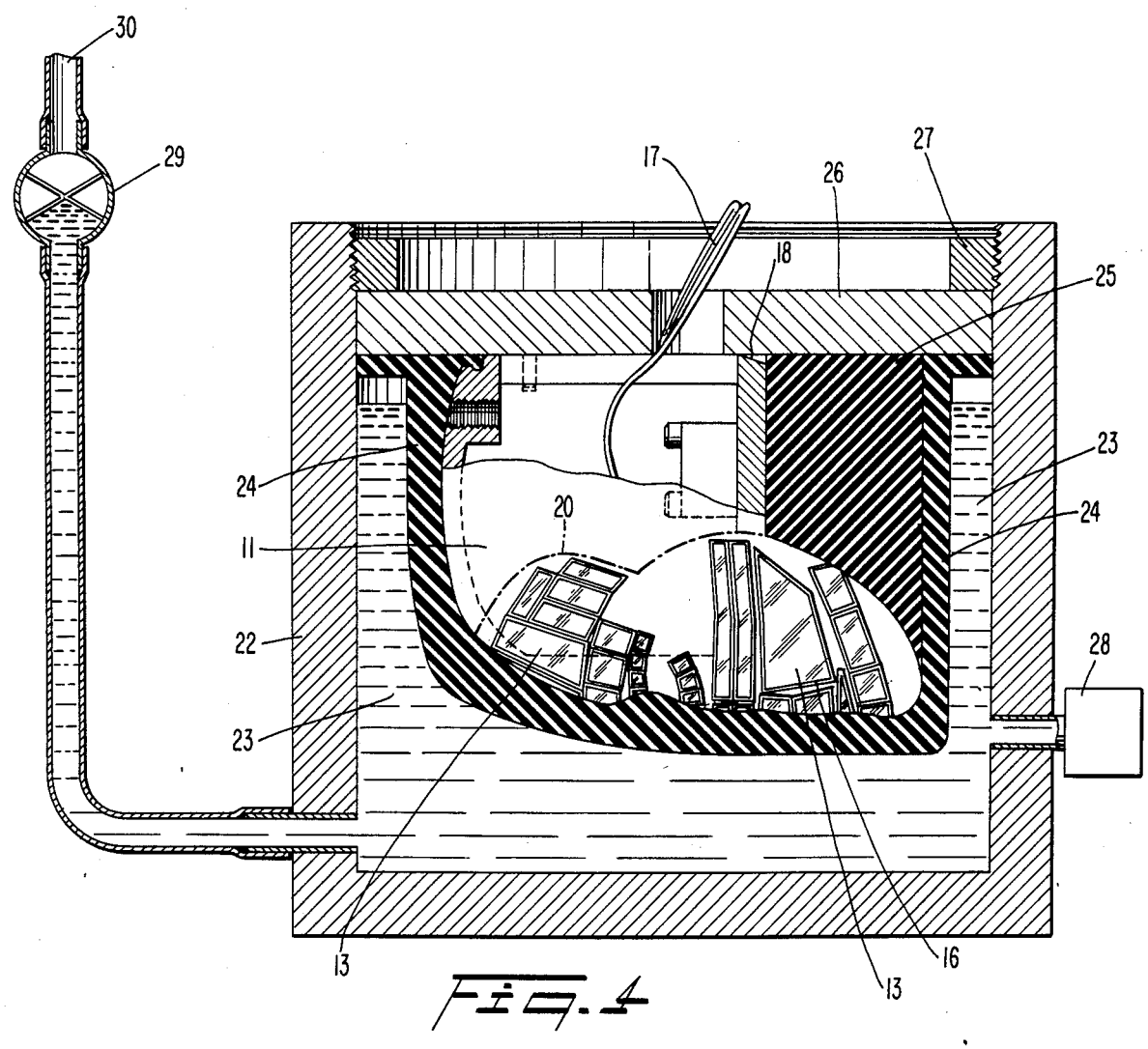

LOAD-SENSING FACEFORM FOR CRASH DUMMY INSTRUMENTATION

BACKGROUND AND OBJECTS OF THE INVENTION

The present invention relates to an arrangement for measuring localized impact forces and pressures applied to the test dummy head. In automotive crash testing, test dummies are used in order to help evaluate the effects of the impact forces. Heretofore, only the accelerations of the head have been available for estimation of facial loads. The most common method of estimating these head loads is that described in Federal Motor Vehicle Safety Standards (FMVSS) 208, utilizing arrays of accelerometers mounted in the dummy head. Traditionally, this method has been used to provide estimates of linear accelerations which are used to estimate the severity of the acceleration loads to the brain.

Head acceleration measured according to the FMVSS 208 procedure is not sufficient to detect localized impacts that cause many of the important facial injuries, which are often related to penetrating fractures of the facial bony structures by poorly-distributed loadings. It is known that there exists a wide range of load limits for different zones of the face. Further, the head acceleration method does not take into account the fact that contact areas are time-variable. A further shortcoming of the existing accelerometer methods, is that they are not able to readily detect localized hard points in the contacted surface.

Previous attempts to measure localized facial loads have met with only partial success. These attempts include sintered foam systems with different foam formulations for different pressure ranges, and various systems using pressure-sensitive films to differentiate pressure levels which generate color or pigment gradients (see (1) "Biofidelity Improvements to the Hybrid III Headform," Newman, J. A. and Gallup, B. M., Proceedings of the 28th Stapp Car Crash Conference, November, 1983; and (2) "Injury Criteria for Combined Restraint Systems", Grosch, Lothar, 10th ITCESV, Oxford, England, July 1–5, 1985). These methods also involve certain shortcomings, however, such as one-time usage; a narrow range of pressures over which each may be used; results which are difficult to interpret; and a complete lack of load-time history data necessary for modeling and extrapolation.

It is, therefore, an object of the present invention to minimize or obviate problems and shortcomings of the types discussed above.

A further objective is to enable the measurement of localized facial impact forces and pressures sustained by the head of a crash test dummy.

An additional objective is to provide an arrangement for measuring the impact forces and pressures applied to the head of a crash test dummy which senses the instantaneous amplitude as well as the duration of these pressures and forces, i.e., time-histories.

SUMMARY OF THE INVENTION

These stated objectives are achieved by the present invention which involves a test dummy head instrumented with a plurality of thin pressure-sensitive electrical films attached to the face. The skull forms a structural support for a face. The films provide electrical signals representative of a time history of pressure or force experienced by the respective individual sensor areas of the face. A hydrodynamic immersion chamber is used to calibrate the system.

BRIEF DESCRIPTION OF THE DRAWINGS

The invention will now be described in detail with reference to the embodiment shown in the accompanying drawings. It is to be understood that this embodiment is only illustrative of the invention and that modifications thereof may be made within the scope of the appending clams. In the drawings:

FIG. 1 is a side view, partly in section, of a test dummy head provided with an arrangement of the present invention;

FIG. 2 is a front view of the head in FIG. 1;

FIG. 3 is a section taken on the line III—III in FIG. 1; and

FIG. 4 is a cross-sectional view of a calibration apparatus.

DETAILED DESCRIPTION OF A PREFERRED EMBODIMENT OF THE INVENTION

The dummy head, generally denoted by 10, is made to conform with the head of a crash test dummy specified in the United States "Federal Motor Vehicle Safety Standard" FMVSS) 208. The head 10 comprises an aluminum skull 11 covered by a molding rubber mask "flesh and skin" 12.

A plurality of thin pressure sensitive films 13 are cemented to the surface of the skull 11 at spaced positions almost completely covering the dummy face. The films, to a number of say about 100 or less, are sought to cover all important areas of the face that might be subjected to impact from, for instance, the steering wheel, windshield, instrument panel, or other objects contacted in case of a crash. Fifty-two film sensors were used in a configuration which was constructed and tested. In order to make possible the application of the films to the dummy face, the face must be machined to provide planar or cylindrical surfaces 16; one surface for each of the films. The film pattern shown in FIG. 2 can of course be altered depending on the intended test application.

The film 13 is a pressure-sensitive electric film. The film may be readily adapted to any cylindrical surface. Sensor films may comprise layers in series-parallel arrangements to provide desired sensitivity and electrical/electronic characteristics. When the film 13 is properly connected electrically and deformed due to an impact, an electrical signal is generated. The output of film 13 is measured and further adapted to produce a time history of the force or pressure applied to the face. The time history of the pressure is represented by the time history of an electric signal generated by the film and associated circuitry upon application of pressure thereon. This time history can be compared to pressures known to produce bone fractures. It has been found that a pressure-sensitive piezoelectric film manufactured by Pennwalt under the trademark KYNAR ® advantageously can be used in the present invention.

Output signals from that pressure sensitive film are processed by data acquisition signal-processing circuitry, and management electronics. A product developed by TransEra Corporation of Provo, Utah has proven to provide good signal-processing and management function (e.g., see "7000-MDAS Reference Manual, 1984"). These signals are combined by relatively simple sensor circuitry and sophisticated calibration hardware and computer software to provide a durable and versatile tool for biomechanical and auto safety research.

The films 13 are attached to their corresponding planar or cylindrical surfaces on the dummy face by means of any suitable bonding substance, e.g., epoxy cement or gel. Each film 13 is connected to the data processing system by a shielded cable, employing conductive cement, contact plates, or other electrical connection. The individual leads are collected into a common shielded electrical cable 14. The cable 14 is conducted through a passage 15 in the skull 11 and rubber mask 12.

The entire sensor-face assembly, i.e., the face with the surfaces 16 and the films 13, is protected by a fiber-reinforced cement layer incorporating an electrical shield layer 20 and, where necessary, contact plates 21 overlying the individual film sensors. The covering layer 20 also is adapted to bind the films 13 and plates 21 to the skull 11. The exterior surface of the cement layer is made to conform to the contour of the face of the unmodified skull, matching the interior surface of the rubber skin 12. By unmodified skull is meant a crash dummy skull having no planar or cylindrical surfaces machined in the face thereof. The entire dummy head may then be covered in conventional manner by the standard skin 12 for experimental use.

The cables 14 lead from the films or sensors 13 to a junction inside the skull cavity. A cable 17 connected to the junction traverses an aperture 18 in the head 10 and leads to a terminal outside the dummy.

In a preferred version, each sensor is handled individually by a field-effect-transistor, operational-amplifier follower circuit, the output of which is sampled by a multiplexer circuitry. Typically, the TransEra MDAS system as used in the embodiment employing the sampling frequency is 5000 samples per second per sensor during a total test duration of 400 msec; this, however, is adjustable at user option. This sampling rate gives the rough equivalent of a 1000 hz frequency response (see "A Free Flight Headform Impact Device for Evaluating the Energy Absorption Characteristics of Vehicle Interiors", Dale K. J. and Clemo, K. C., Proceedings of the 10th ITCESV, Oxford, England, July 1-4, 1985). Using this device, slower sampling rates can be selected and any combination of specific sensors from one to fifty-two or more can be arbitrarily chosen to be sampled. As currently configured, battery power allows the data acquisition unit to be portable enough to be carried in the test vehicle if desired. Its signal conditioning system contains the necessary circuitries for triggering, biasing, and calibration of each individual sensor. Pre-trigger data can be obtained for a preselected period of time by having the system continuously sample the sensors, cycling the data through the memory banks and saving only that portion programmed for retrieval.

Following a test, the random-access-memory incorporated in the data acquisition system is interrogated by an augmented-memory desk-top microcomputer (or other computer with 5 megabytes of storage) to retrieve the stored data. The data can then be signal-processed, plotted and displayed as desired. The data from all pressure sensors stored in memory can be processed and stored on disk for further processing and evaluation post-test. In practical applications, it may not be necessary to interrogate all sensors in a given face configuration for any given test. Experience readily indicates those sensors likely to be critical in a given situation. Furthermore, the software provides means to select only sensors which are of interest.

Prior to an impact test, the sensing system is calibrated. Three calibration factors are used which relate to (1) zero offset, (2) charge leakage, and (3) scale factor. Zero offset occurs because of a steady-state charge acquired by a film sensor and its wiring, which act as a small capacitor. The acquired charge originates from its amplifier input circuitry.

Charge leakage relates to loss of pressure generated charge during test runs by high-resistance leakage paths associated with a film sensor, its wiring, and its amplifier shunt input resistance. The leakage rate is well-behaved and consistent, allowing compensation by the data processing software. Inasmuch as the film is linear, only a simple scaling factor is needed, together with the offset and leakage factors to accurately calibrate the sensors. The calibration technique involves introduction of a measured reference pressure pulse by mechanical means and a modified linear regression software program to determine the three above-mentioned calibration factors for each sensor.

The dummy head sensor calibration is accomplished by means of a unique immersion calibration chamber system shown in FIG. 4. The neck, skin, and skullcap are removed from the dummy skull 11 and the dummy skull is inserted into an immersion pressure vessel calibration chamber 22. The dummy skull is fitted to a flexible rubber boot 24 which has been cast to match the exterior form of the skull face. An incompressible rubber insert 25 is fitted to close-up void spaces between the skull 11 and the boot 24. The boot serves to isolate the skull from contact with an incompressible liquid 23 which fills all space between the boot and the interior surface of the calibration chamber, as well as giving contact with the quick opening control valve 29 and a reference pressure transducer 28. The flexible isolating boot 24 also serves to transmit pressure directly from the liquid to the individual sensors. The sensor cables leading from the dummy head are passed through an aperture in the retention plate 26 which is held in place by a force retention ring 27. In application during actual calibration, with the sensor cables attached to the data processing circuitry, and all air removed from the hydraulic circuit, a source of high pressure gas is connected to the quick opening valve through the tube 30 an the quick opening valve is actuated such as to provide a sharp pressure pulse which is simultaneously sensed by the individual sensors on the face and the reference pressure transducer 28.

In the preferred embodiment of the calibration device, pressure calibration was accomplished by simultaneous dynamic application to all faceform sensors and a piezoresistive pressure transducer in the calibration chamber. For calibration, the instrumented aluminum skull was inserted into the rubber boot, which was evacuated to remove air pockets. The boot itself was pressure sealed in the chamber 22 which had also been bled to remove air. The chamber was subjected to a pressure pulse supplied by 300 psi inert gas introduced into a pressurizing chamber through the quick-opening valve. A calibrated strain-gage pressure transducer tapped into the pressure chamber was used to measure the reference pressure pulse. The data acquisition system, controlled by computer software, generated a file of individual sets of calibration factors for each sensor, to be used later to correct and evaluate facial impact data.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What we claim is:

1. A test dummy head for measuring the effects of impact force and pressure applied thereto, said head comprising a skull forming a face, a plurality of thin pressure-sensitive piezoelectric films attached to said face, said films providing eletrical signals representative of a time history of pressure applied to said face, said face containing individually machined surfaces sized to receive said films.

2. Apparatus according to claim 1, wherein said surfaces are planar.

3. Apparatus according to claim 1, wherein said surfaces are cylindrical.

4. Apparatus according to claim 1, wherein said films sensors are attached to said surfaces by cement.

5. Apparatus according to claim 4 including electrical cables attached to said films to conduct signals to points outside the head.

6. Apparatus according to claim 1, wherein said face and films thereon are covered by a layer of fiber-reinforced cement substance.

7. Apparatus according to claim 6, wherein said films are secured to said face by said cement.

8. Apparatus according to claim 6 including an electrical shield layer incorporated in said layer of cement.

9. Apparatus for calibrating a test dummy head of the type comprising a skull forming a face, and a plurality of thin pressure-sensitive films attached to said face for providing electrical signals representative of pressure applied to said face, said apparatus comprising:
    a chamber;
    a boot formed of a flexible material and positioned across said chamber such that one side of said boot faces a space in said chamber, and an opposite side of said boot is shaped in accordance with a profile of said face for receiving said face such that said films face toward said space; and
    means for conducting a pressurized medium into said space and against said one side such that the pressure from said medium is transmitted to said films by said boot.

10. Apparatus according to claim 9, wherein said conducting means comprises means for conducting pressurized gas.

* * * * *